(12) United States Patent
Noble et al.

(10) Patent No.: US 8,526,821 B2
(45) Date of Patent: Sep. 3, 2013

(54) TRANSCEIVERS FOR TESTING NETWORKS AND ADAPTING TO DEVICE CHANGES

(75) Inventors: Gayle L. Noble, Boulder Creek, CA (US); Lucy G. Hosking, Santa Cruz, CA (US); Luke M. Ekkizogloy, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 1434 days.

(21) Appl. No.: 11/966,646

(22) Filed: Dec. 28, 2007

(65) Prior Publication Data

US 2008/0159737 A1 Jul. 3, 2008

Related U.S. Application Data

(60) Provisional application No. 60/882,805, filed on Dec. 29, 2006, provisional application No. 60/913,158, filed on Apr. 20, 2007.

(51) Int. Cl.
*H04B 10/00* (2006.01)

(52) U.S. Cl.
USPC .............. 398/135; 398/138; 398/139; 398/16

(58) Field of Classification Search
USPC .................. 398/9, 16, 22, 25–27, 33, 58, 135, 398/138, 164, 136, 128, 130, 23, 24, 137, 398/139, 140, 158, 141, 159
See application file for complete search history.

(56) References Cited

U.S. PATENT DOCUMENTS

| | | | |
|---|---|---|---|
| 4,340,932 A | 7/1982 | Bakula et al. | |
| 4,468,728 A | 8/1984 | Wang | |
| 4,611,272 A | 9/1986 | Lomet | |
| 4,775,956 A | 10/1988 | Kaji et al. | |
| 4,866,701 A | 9/1989 | Giacopelli et al. | |
| 4,879,630 A | 11/1989 | Boucard et al. | |
| 4,891,803 A | 1/1990 | Huang et al. | |
| 5,390,359 A | 2/1995 | Damerau | |
| 5,416,769 A | 5/1995 | Karol | |
| 5,459,731 A | 10/1995 | Brief | |

(Continued)

FOREIGN PATENT DOCUMENTS

| | | |
|---|---|---|
| WO | 2004097576 | 11/2004 |
| WO | 2005/018162 A1 | 2/2005 |

OTHER PUBLICATIONS

United States Patent and Trademark Office, U.S. Appl. No. 11/344,892, Office Action mailed Aug. 18, 2009.

(Continued)

*Primary Examiner* — M. R. Sedighian

(74) *Attorney, Agent, or Firm* — Maschoff Brennan

(57) ABSTRACT

Test transceivers are disclosed for testing optical networks. The test transceivers generate one or more errors on a network in a specific, reproducible way, thereby enabling a tester to easily and readily identify whether network devices are operating properly, or prone to failure. A corrective transceiver is also disclosed. The corrective transceiver is configured to continually detect operating parameters of one or more network devices in a network. The corrective transceiver can identify the operating parameters through out-of-band communication with the one or more network devices. The corrective transceiver is further configured with one or more instructions to adjust its own operating parameters to re-sync with another network device as necessary to continue network communications during a failure of the network device.

17 Claims, 9 Drawing Sheets

(56) References Cited

U.S. PATENT DOCUMENTS

| | | |
|---|---|---|
| 5,461,614 A | 10/1995 | Lindholm |
| 5,500,858 A | 3/1996 | McKeown |
| 5,625,371 A | 4/1997 | Miller et al. |
| 5,659,680 A | 8/1997 | Cunningham et al. |
| 5,724,509 A | 3/1998 | Starkweather et al. |
| 5,786,921 A | 7/1998 | Wang et al. |
| 5,793,871 A | 8/1998 | Jackson |
| 5,841,982 A | 11/1998 | Brouwer et al. |
| 5,847,708 A | 12/1998 | Wolff |
| 5,850,388 A | 12/1998 | Anderson et al. |
| 5,884,072 A | 3/1999 | Rasmussen |
| 5,978,947 A | 11/1999 | Kim et al. |
| 6,115,680 A | 9/2000 | Coffee et al. |
| 6,163,681 A | 12/2000 | Wright et al. |
| 6,246,684 B1 | 6/2001 | Chapman et al. |
| 6,266,789 B1 | 7/2001 | Bucher et al. |
| 6,298,047 B1 | 10/2001 | Steffes et al. |
| 6,393,341 B1 | 5/2002 | Lawrence et al. |
| 6,393,587 B2 | 5/2002 | Bucher et al. |
| 6,467,053 B1 | 10/2002 | Connolly et al. |
| 6,473,794 B1 | 10/2002 | Guheen et al. |
| 6,480,313 B1 | 11/2002 | Kawamura |
| 6,507,923 B1 | 1/2003 | Wall et al. |
| 6,618,368 B1 | 9/2003 | Tanigawa et al. |
| 6,662,009 B2 | 12/2003 | Lynn |
| 6,674,724 B1 | 1/2004 | Main et al. |
| 6,678,275 B1 | 1/2004 | DeGrandpre et al. |
| 6,686,759 B1 | 2/2004 | Swamy |
| 6,691,165 B1 | 2/2004 | Bruck et al. |
| 6,697,379 B1 | 2/2004 | Jacquet et al. |
| 6,701,269 B1* | 3/2004 | Jungerman et al. ........... 702/106 |
| 6,714,217 B2 | 3/2004 | Huang et al. |
| 6,738,645 B2 | 5/2004 | Knight |
| 6,745,011 B1 | 6/2004 | Hendrickson et al. |
| 6,754,488 B1 | 6/2004 | Won et al. |
| 6,791,956 B1 | 9/2004 | Leu |
| 6,801,756 B1 | 10/2004 | Agrawal et al. |
| 6,801,949 B1 | 10/2004 | Bruck et al. |
| 6,839,321 B1 | 1/2005 | Chiruvolu |
| 6,842,429 B1 | 1/2005 | Shridhar et al. |
| 6,850,483 B1 | 2/2005 | Semaan |
| 6,853,620 B2 | 2/2005 | Mauritz et al. |
| 6,880,070 B2 | 4/2005 | Gentieu et al. |
| 6,910,149 B2 | 6/2005 | Perloff et al. |
| 6,931,574 B1 | 8/2005 | Coupal et al. |
| 6,934,477 B2 | 8/2005 | Willebrand |
| 6,941,482 B2 | 9/2005 | Strong |
| 6,954,789 B2 | 10/2005 | Dietz et al. |
| 6,970,917 B1 | 11/2005 | Kushwaha et al. |
| 6,996,418 B2 | 2/2006 | Teo et al. |
| 7,003,080 B1 | 2/2006 | Doskow et al. |
| 7,007,208 B1 | 2/2006 | Hibbert et al. |
| 7,027,808 B2 | 4/2006 | Wesby |
| 7,062,264 B2 | 6/2006 | Ko et al. |
| 7,100,092 B2 | 8/2006 | Allred et al. |
| 7,110,954 B2 | 9/2006 | Yung et al. |
| 7,120,149 B2 | 10/2006 | Salamat |
| 7,181,138 B1* | 2/2007 | Gerstel et al. ................... 398/33 |
| 7,181,663 B2 | 2/2007 | Hildebrant |
| 7,194,503 B2 | 3/2007 | Shell et al. |
| 7,206,972 B2 | 4/2007 | Wilson et al. |
| 7,224,968 B2 | 5/2007 | Dobson et al. |
| 7,242,862 B2* | 7/2007 | Saunders et al. ................ 398/30 |
| 7,257,741 B1 | 8/2007 | Palenik et al. |
| 7,263,286 B2* | 8/2007 | Peng .............................. 398/22 |
| 7,283,816 B2 | 10/2007 | Fok et al. |
| 7,286,510 B2 | 10/2007 | Wang et al. |
| 7,286,515 B2 | 10/2007 | Olson et al. |
| 7,286,647 B2 | 10/2007 | Stormon et al. |
| 7,313,113 B1 | 12/2007 | Hills et al. |
| 7,330,662 B2 | 2/2008 | Zimmerman |
| 7,343,524 B2 | 3/2008 | Klotz et al. |
| 7,349,692 B2 | 3/2008 | Ko et al. |
| 7,372,848 B2 | 5/2008 | Doerr et al. |
| 7,380,154 B2 | 5/2008 | Gale et al. |
| 7,457,312 B2 | 11/2008 | Weiss et al. |
| 7,483,974 B2 | 1/2009 | Goud et al. |
| 7,522,835 B1* | 4/2009 | Guertin et al. ................... 398/14 |
| 7,522,904 B1 | 4/2009 | Zhu |
| 7,523,198 B2 | 4/2009 | Wu et al. |
| 7,526,322 B2 | 4/2009 | Whistler |
| 7,545,740 B2 | 6/2009 | Zelig et al. |
| 7,551,922 B2 | 6/2009 | Roskowski et al. |
| 2001/0016925 A1 | 8/2001 | Bucher |
| 2001/0049263 A1 | 12/2001 | Zhang |
| 2002/0025795 A1 | 2/2002 | Sharon et al. |
| 2002/0044662 A1 | 4/2002 | Sowler |
| 2002/0055999 A1 | 5/2002 | Takeda |
| 2002/0068600 A1 | 6/2002 | Chihara et al. |
| 2002/0078178 A1 | 6/2002 | Senoh |
| 2002/0112041 A1 | 8/2002 | Viscount et al. |
| 2002/0122050 A1 | 9/2002 | Sandberg |
| 2002/0149812 A1* | 10/2002 | Hong et al. .................... 359/110 |
| 2002/0161875 A1 | 10/2002 | Raymond |
| 2002/0181405 A1 | 12/2002 | Ying |
| 2002/0181506 A1 | 12/2002 | Loguinov |
| 2003/0038769 A1 | 2/2003 | Turpin et al. |
| 2003/0048854 A1 | 3/2003 | Kaku |
| 2003/0157897 A1 | 8/2003 | Agrawal et al. |
| 2003/0167405 A1 | 9/2003 | Freund et al. |
| 2003/0204781 A1 | 10/2003 | Peebles et al. |
| 2003/0220112 A1 | 11/2003 | Bugeja |
| 2003/0226034 A1 | 12/2003 | Howard et al. |
| 2004/0006633 A1 | 1/2004 | Chandra et al. |
| 2004/0015317 A1 | 1/2004 | Klotz et al. |
| 2004/0054680 A1 | 3/2004 | Kelley et al. |
| 2004/0057389 A1 | 3/2004 | Klotz et al. |
| 2004/0076194 A1 | 4/2004 | Okamoto et al. |
| 2004/0091028 A1* | 5/2004 | Aronson et al. ............... 375/219 |
| 2004/0100963 A1 | 5/2004 | Guo |
| 2004/0107391 A1 | 6/2004 | Bauman |
| 2004/0133733 A1 | 7/2004 | Bean et al. |
| 2004/0153267 A1 | 8/2004 | Fishman et al. |
| 2004/0177344 A1 | 9/2004 | Kuo |
| 2004/0185876 A1 | 9/2004 | Groenendaal et al. |
| 2004/0199568 A1 | 10/2004 | Lund |
| 2004/0203379 A1 | 10/2004 | Witkowski et al. |
| 2004/0225916 A1 | 11/2004 | Clark |
| 2004/0242197 A1 | 12/2004 | Fontaine |
| 2004/0255191 A1 | 12/2004 | Fox et al. |
| 2004/0264448 A1 | 12/2004 | Wise et al. |
| 2005/0013300 A1 | 1/2005 | Akahane et al. |
| 2005/0034055 A1 | 2/2005 | Rangan et al. |
| 2005/0050190 A1 | 3/2005 | Dube |
| 2005/0060402 A1 | 3/2005 | Oyadomari et al. |
| 2005/0060403 A1 | 3/2005 | Bernstein et al. |
| 2005/0078606 A1 | 4/2005 | Bernstein et al. |
| 2005/0078692 A1 | 4/2005 | Gregson |
| 2005/0085259 A1 | 4/2005 | Conner et al. |
| 2005/0114083 A1 | 5/2005 | Bullis |
| 2005/0120269 A1 | 6/2005 | Larson |
| 2005/0166023 A1 | 7/2005 | Kasako et al. |
| 2005/0169638 A1* | 8/2005 | Tayebati et al. ................ 398/159 |
| 2005/0172161 A1 | 8/2005 | Cruz et al. |
| 2005/0185597 A1 | 8/2005 | Le et al. |
| 2005/0185658 A1 | 8/2005 | Kamiwada |
| 2005/0232284 A1 | 10/2005 | Karaoguz et al. |
| 2005/0232291 A1 | 10/2005 | Brown et al. |
| 2005/0249214 A1 | 11/2005 | Peng |
| 2005/0254488 A1 | 11/2005 | Huang |
| 2005/0257104 A1 | 11/2005 | Wood |
| 2005/0260982 A1 | 11/2005 | Ko et al. |
| 2005/0281193 A1* | 12/2005 | Hofmeister et al. .......... 370/217 |
| 2006/0002712 A1* | 1/2006 | Ekkizogloy et al. .......... 398/135 |
| 2006/0058982 A1 | 3/2006 | Yamada et al. |
| 2006/0095174 A1 | 5/2006 | Sonnenrein et al. |
| 2006/0101271 A1 | 5/2006 | Thomas |
| 2006/0117300 A1 | 6/2006 | Puthukattukaran et al. |
| 2006/0198312 A1 | 9/2006 | Schondelmayer et al. |
| 2006/0198318 A1 | 9/2006 | Schondelmayer et al. |
| 2006/0198319 A1 | 9/2006 | Schondelmayer et al. |
| 2006/0200708 A1 | 9/2006 | Gentieu et al. |
| 2006/0200711 A1 | 9/2006 | Schondelmayer et al. |
| 2006/0205398 A1 | 9/2006 | Seckendorf et al. |

| | | | |
|---|---|---|---|
| 2006/0230134 A1 | 10/2006 | Qian et al. | |
| 2006/0230312 A1 | 10/2006 | Nichols et al. | |
| 2006/0246845 A1 | 11/2006 | Lawson et al. | |
| 2006/0264178 A1 | 11/2006 | Noble et al. | |
| 2007/0086351 A1 | 4/2007 | Noble et al. | |
| 2007/0087741 A1 | 4/2007 | Noble et al. | |
| 2007/0087771 A1 | 4/2007 | Noble et al. | |
| 2007/0088981 A1 | 4/2007 | Noble et al. | |
| 2007/0099567 A1 | 5/2007 | Chen et al. | |
| 2007/0146782 A1 | 6/2007 | Lehotsky et al. | |
| 2007/0287450 A1 | 12/2007 | Yang et al. | |
| 2008/0008128 A1 | 1/2008 | Nagarajan et al. | |
| 2008/0069567 A1* | 3/2008 | Smith | 398/106 |
| 2009/0254650 A1 | 10/2009 | Sheppard | |

OTHER PUBLICATIONS

United States Patent and Trademark Office, U.S. Appl. No. 11/344,883, Office Action mailed Oct. 2, 2009.
United States Patent and Trademark Office, U.S. Appl. No. 11/685,548, Office Action mailed Nov. 2, 2009.
United States Patent and Trademark Office, U.S. Appl. No. 11/348,745, Office Action mailed Aug. 3, 2009.
United States Patent and Trademark Office, U.S. Appl. No. 11/776,226, Office Action mailed Aug. 13, 2009.
United States Patent and Trademark Office, U.S. Appl. No. 11/776,226, Amendment and Response filed Jan. 13, 2010.
United States Patent and Trademark Office, U.S. Appl. No. 11/776,226, Office Action mailed Mar. 9, 2010.
United States Patent and Trademark Office, U.S. Appl. No. 11/776,226, Amendment and Response filed Jul. 9, 2010.
United States Patent and Trademark Office, U.S. Appl. No. 11/685,551, Office Action mailed Nov. 3, 2009.
United States Patent and Trademark Office, U.S. Appl. No. 11/537,590, Notice of Allowance mailed Aug. 28, 2009.
United States Patent and Trademark Office, U.S. Appl. No. 11/344,893, Office Action mailed Jul. 20, 2009.
United States Patent and Trademark Office, U.S. Appl. No. 11/204,920, Office Action mailed Jun. 9, 2009.
United States Patent and Trademark Office, U.S. Appl. No. 11/134,786, Office Action mailed May 12, 2009.
United States Patent and Trademark Office, U.S. Appl. No. 11/134,786, Amendment and Response to Office Action filed Nov. 12, 2009.
United States Patent and Trademark Office, U.S. Appl. No. 11/134,786, Office Action mailed Dec. 4, 2009.
United States Patent and Trademark Office, U.S. Appl. No. 11/537,599, Office Action mailed Sep. 15, 2009.
United States Patent and Trademark Office, U.S. Appl. No. 11/744,591, Office Action mailed Jul. 31, 2009.
United States Patent and Trademark Office, U.S. Appl. No. 11/744,591, Amendment and Response to Office Action, filed Feb. 1, 2010.
United States Patent and Trademark Office, U.S. Appl. No. 11/744,591, Office Action mailed May 10, 2010.
United States Patent and Trademark Office, U.S. Appl. No. 11/744,591, Amendment "B" & Response filed Jul. 23, 2010.
United States Patent and Trademark Office, U.S. Appl. No. 11/345,202, Office Action mailed Jul. 2, 2009.
United States Patent and Trademark Office, U.S. Appl. No. 11/279,360, Office Action mailed Jun. 11, 2009.
United States Patent and Trademark Office, U.S. Appl. No. 11/537,602, Office Action mailed Sep. 10, 2009.
United States Patent and Trademark Office, U.S. Appl. No. 11/537,595, Office Action mailed Sep. 16, 2009.
United States Patent and Trademark Office, U.S. Appl. No. 11/413,829, Office Action mailed Sep. 1, 2009.
United States Patent and Trademark Office, U.S. Appl. No. 11/413,829, Amendment and Response to Office Action filed Jan. 25, 2010.
United States Patent and Trademark Office, U.S. Appl. No. 11/413,829, Office Action mailed Feb. 19, 2010.
United States Patent and Trademark Office, U.S. Appl. No. 11/413,829 Amendment "C" & Response filed Jun. 21, 2010.
U.S. Appl. No. 10/218,343, filed Aug. 13, 2002, Farley et al.
U.S. Appl. No. 10/228,212, filed Aug. 26, 2002, Dubé et al.
U.S. Appl. No. 10/307,272, filed Nov. 27, 2002, Bain et al.
U.S. Appl. No. 10/424,361, filed Apr. 25, 2003, Foster et al.
U.S. Appl. No. 10/424,363, filed Apr. 25, 2003, Bain et al.
U.S. Appl. No. 10/424,364, filed Apr. 25, 2003, Bain et al.
U.S. Appl. No. 10/448,670, filed May 30, 2003, Cicchetti et al.
U.S. Appl. No. 10/448,827, filed May 30, 2003, Garcia et al.
U.S. Appl. No. 10/764,218, filed Jan. 23, 2004, Durham et al.
U.S. Appl. No. 11/344,829, filed Feb. 1, 2006, Lawson et al.
U.S. Appl. No. 11/344,883, filed Feb. 1, 2006, Schondelmayer et al.
U.S. Appl. No. 11/344,892, filed Feb. 1, 2006, Schondelmayer et al.
U.S. Appl. No. 11/344,893, filed Feb. 1, 2006, Schondelmayer et al.
U.S. Appl. No. 11/345,202, filed Feb. 1, 2006, Schondelmayer et al.
U.S. Appl. No. 11/537,590, filed Sep. 29, 2006, Noble et al.
U.S. Appl. No. 11/537,595, filed Sep. 29, 2006, Noble et al.
U.S. Appl. No. 11/537,599, filed Sep. 29, 2006, Noble et al.
U.S. Appl. No. 11/537,602, filed Sep. 29, 2006, Noble et al.
U.S. Appl. No. 11/930,677, filed Oct. 31, 2007, Noble et al.
U.S. Appl. No. 11/433,290, filed May 12, 2006, Foster.
P. Sharma et al., "Channel Models for Indoor Wireless Transmission," University of Massachusetts Lowell, Lowell, MA, 6 pages, Proceedings of International Conference on Third Generation Wireless and Beyond 2001.
P. Sharma et al., "Interference in Indoor Wireless Channels," University of Massachusetts Lowell, Lowell, MA, 10 pages.
O. Oteri and A. Paulraj, "Fading and Interference Mitigation in Multi-Antenna Wireless Transmission," Wireless Communications and Networking Conference, 2005 IEEE, Mar. 2005, 6 pages.
Finisar Xgig Analyzer User's Guide Fibre Channel, Gig-E; May 3, 2005, 164 pages.
Finisar NetWisdom 2.1 User's Guide; Jul. 2005, 316 pages.
Finisar NetWisdom 2.1 User's Guide, Sep. 2005, 316 pages.
"IEEE Standard Test Access Port and Boundary-Scan Architecture," Test Technology Standards Committee of the IEEE Computer Society, IEEE std 1149.1-2001 (2001).
IEEE Standard Test Access Port and Boundary-Scan Architecture, Test Technology Standards Committee of the IEEE Computer Society, IEEE Std 1149.1-1990 (1990).
Supplement to IEEE Std 1149.1-1990, IEEE Standard Test Access Port and Boundary-Scan Architecture, test Technology Standards Committee of the IEEE Computer Society (1995).
"LoadRunner Info," http//www.wilsonmar.com/1loadrun.htm.
"Mercury LoadRunner 8.0," Copyright 2005 CNET Networks, Inc., http://downloads.zdnet.co.uk/0,39025604,39092344s,00.htm.
"QA Wizard vs. WinRunner—Are you paying too much for automated testing?" Seapine Software, http://www.seapine.com/gawvswinrunner.html.
"Testing and Code Analysis Tools," http://www.laatuk.com/tools/testing_tools.html.
Ezchip Announces the NP-1c, Its Second Generation 10-Gigabit Network Processor, http://www.ezchip.com/html/press_021021.html; Oct. 21, 2002; 4 pages.
TOPcore™ EZchip's Task Optimized Processing Core Technology; http://web.archive.org/web/20040204074648/http://www.ezchip.com/html/tech_r.html; Feb. 4, 2004; 4 pages.
NP-1c Network Processor 10-Gigabit 7-Layer Network Processor with Integrated Search Engines; http://www.ezchip.com/html/pr_np-1c.html; Date Downloaded Jul. 21, 2004; 5 pages.
NP-1c: 10-Gigabit 7-Layer Network Processor with Integrated Search Engines, Product Brief; http://www.ezchip.com/images/pdfs/EZchip_NP-1c_Brief_online.pdf; Date Downloaded: Jul. 20, 2004; Copyright 2003; 2 pages.
Performance Benchmarks; http://www.ezchip.com/html/pr_benchmarks.html; Jul. 28, 2004; 3 pages.
NP-1c Network Processor 10-Gigabit Network Processor with Integrated Search Engines; http://www.ezchip.com/html/pr_np-1c.html; Apr. 4, 2006; 5 pages.
Finisar Xgig Analyzer Blades Hardware Guide; Apr. 8, 2004; 22 pages.
Finisar Xgig Analyzer User's Guide Fibre Channel, Infiniband, Gig-E; Apr. 8, 2004; 124 pages.
NP-1c Programming Overview White Paper; Jul. 2004; 4 pages.

Frequently Asked Questions, The Wayback Machine; http://www.archive.org/about/faqs.php; Nov. 9, 2006; 48 pages.
Cisco—What Does the show ip ospf interface Command Reveal? Sep. 9, 2004; 7 pages.
Cisco—Preventing Duplicate EIGRP Router IDs; Oct. 14, 2004; 7 pages.
Cisco—Configuring IS-IS for IP on Cisco Routers; Aug. 1, 2005; 8 pages.
Cisco—Dial-on-demand Routing (DDR) with Easy IP and DHCP Server; Oct. 24, 2005; 11 pages.
Using OSPF Stub Router Advertisement Feature; http://www.cisco.com/warp/public/cc/pd/iosw/prodlit/osfn_tc.htm; Apr. 10, 2006; 6 pages.
Products & Solutions; http://www.ezchip.com/html/prod_r.html; Date Downloaded: Aug. 4, 2004; 2 pages.
NP-1 Family: The World's Most Highly Integrated 10-Gigabit 7-Layer Network Processors;http://web.archive.org/web/20030214201226/www.ezchip.com/html/pr_np-1.html; Date Downloaded: Jul. 28, 2004; 5 pages.
Internet Archive, Frequently Asked Questions; http://www.archive.org/about/faqs.php; Date Downloaded: Jul. 28, 2004; 34 pages.
In-Line Taps: Full Duplex Single or Multi-port Ethernet and Fibre Channel Taps; Date Downloaded: Aug. 3, 2004; 2 pages.
SAN QoS ProbeFC; Date Downloaded: Aug. 3, 2004; 2 pages.
Tech Notes: Using Single Port Taps with IDS Systems; Date Downloaded: Aug. 3, 2004; 1 page.
Eberle, H. et al.; "Testing Systems Wirelessly." VLSI Test Symposium, 2004, 22nd IEEE Proceedings, Apr. 25-29, 2004, pp. 335-340.

U.S. Appl. No. 11/134,786, Jul. 23, 2008, Office Action.
U.S. Appl. No. 11/204,920, Mar. 18, 2008, Office Action.
U.S. Appl. No. 11/204,920, Oct. 3, 2008, Office Action.
U.S. Appl. No. 11/279,360, Mar. 19, 2008, Office Action.
U.S. Appl. No. 11/279,360, Oct. 1, 2008, Office Action.
U.S. Appl. No. 11/348,745, Sep. 8, 2008, Office Action.
U.S. Appl. No. 11/348,745, Mar. 26, 2009, Office Action.
U.S. Appl. No. 11/348,745, Apr. 24, 2009, Office Action.
U.S. Appl. No. 11/413,829, Nov. 19, 2008, Office Action.
U.S. Appl. No. 11/344,883, Dec. 24, 2008, Office Action.
U.S. Appl. No. 11/344,892, Jan. 27, 2009, Office Action.
U.S. Appl. No. 11/344,892, Jul. 18, 2008, Office Action.
U.S. Appl. No. 11/344,893, Jan. 5, 2009, Office Action.
U.S. Appl. No. 11/344,893, Jul. 22, 2008, Office Action.
U.S. Appl. No. 11/345,202, Jan. 27, 2009, Office Action.
U.S. Appl. No. 11/345,202, Jun. 26, 2008, Office Action.
U.S. Appl. No. 11/344,883, Mar. 10, 2010, Office Action.
U.S. Appl. No. 11/930,677, Jun. 9, 2010, Office Action.
U.S. Appl. No. 11/413,829, Aug. 26, 2010, Final Office Action.
U.S. Appl. No. 11/413,829, Oct. 25, 2010, Notice of Allowance.
U.S. Appl. No. 11/537,590, Mar. 25, 2009, Office Action.
U.S. Appl. No. 11/776,226, Sep. 9, 2010, Office Action.
U.S. Appl. No. 11/776,226, Apr. 18, 2011, Office Action.
U.S. Appl. No. 12/198,631, May 5, 2011, Restriction Requirement.

* cited by examiner

TRANSCEIVERS FOR TESTING NETWORKS AND ADAPTING TO DEVICE CHANGES

CROSS-REFERENCE TO RELATED APPLICATIONS

This application claims the benefit of U.S. Provisional Patent Application 60/882,805 filed Dec. 29, 2006, the contents of which are hereby incorporated by reference herein. This application also claims the benefit of U.S. Provisional Patent Application 60/913,158 filed May 1, 2007, the contents of which are hereby incorporated by reference herein.

BACKGROUND

Fiber-optics and optoelectronics are important aspects of modern networks at least in part since they allow for efficient, accurate and rapid transmission of optical data between various components in the network system. Optical transceiver modules ("transceivers") are an example of devices used in networks ("network devices"). Since there are many different types of network devices, error testing each type of network device typically requires expensive equipment, and may not be easily accomplished.

Currently, there is no easy, relatively inexpensive, and repeatable way to test network devices to insure that they operate in accordance with their specifications. As such, a consumer using a network device, such as a serializer/deserializer ("SERDES"), a host bus adapter ("HBA"), switch, and any network device that interoperates with a transceiver, has been unable to verify the ability of the network device to handle a specific error (or specific level of error). In particular, there is no consumer device that can easily or efficiently test a network device's ability to deal with specific conditions within a network in a logical and/or repeatable manner. As a result, and since errors in a network are not always repeatable, a technician may often spend several days of random pattern testing to identify errors.

BRIEF SUMMARY

Implementations of the present invention include network devices configured to identify errors in the network with specificity, and without necessarily requiring undue experimental procedures or expensive apparatus. In addition, implementations of the present invention include network devices that can accommodate or otherwise operate with errantly operating devices for such time as sufficient until the errant network devices are replaced or modified.

For example, at least one transceiver in accordance with an implementation of the present invention includes a feature for introducing a predetermined, known, controlled, and/or repeatable error into the network (a "test transceiver"). The test transceivers may be any form factor, such as SFP, SFX, GBIC, XFP, XAUI, SFF, 1x9 Transceivers, 300pin Transponders, XFP Transceivers, and SFP+ Transceivers. Using the test transceiver, another network device with which the test transceiver is communicating can be monitored to identify its reaction to the introduced error. Since the introduced error from the test transceiver is known, controlled, specific and repeatable, the reaction to the introduced error by the network device can be easily determined and isolated.

In addition, another transceiver (a "corrective transceiver") in accordance with an implementation of the present invention can be configured to accommodate operating errors in other transceivers on the network. In one implementation, for example, a corrective transceiver can communicate out of band with another transceiver to identify a change in operating parameters of another transceiver, such as due to error or malfunction. The corrective transceiver can identify any new operating parameters in order to sync (and ultimately continue communications) with the errant transceiver, and further report the changes and/or new operating parameters to a listening portal.

Accordingly, implementations of the present invention can not only identify errors with great specificity, but also accommodate operating errors with other transceivers on the network until the errant hardware are replaced or fixed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
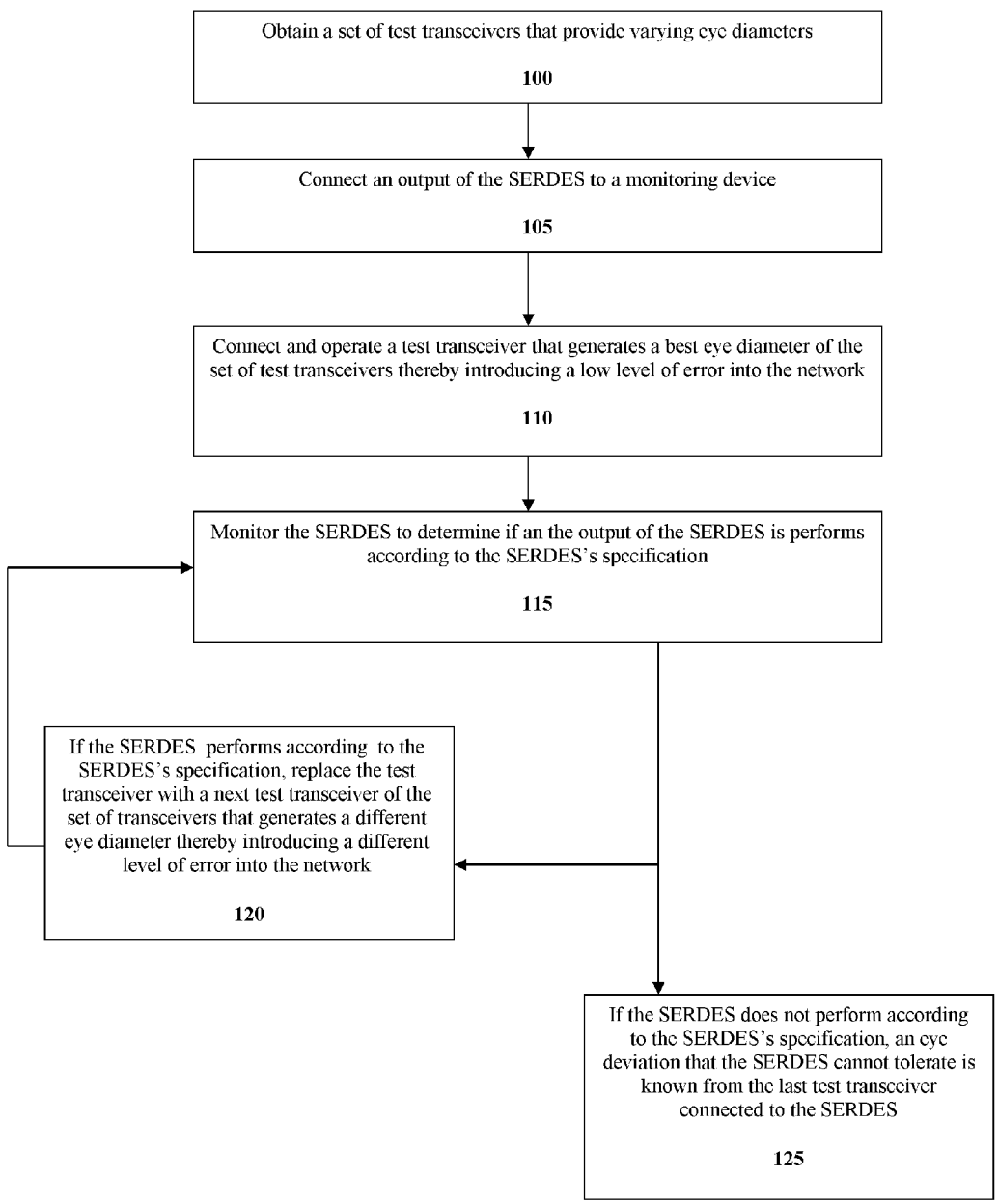
FIG. 1 illustrates a method for error testing a network.

Implementations of the present invention extend to network devices configured to identify errors in the network with specificity, and without necessarily requiring undue experimental procedures or expensive apparatus. In addition, implementations of the present invention include network devices that can accommodate or otherwise operate with errantly operating devices for such time as sufficient until the errant network devices are replaced or modified.

For example, at least one transceiver in accordance with an implementation of the present invention includes a feature for introducing a predetermined, known, controlled, and/or repeatable error into the network (a "test transceiver"). The test transceivers may be any form factor, such as SFP, SFX, GBIC, XFP, XAUI, SFF, 1x9 Transceivers, 300pin Transponders, XFP Transceivers, and SFP+Transceivers. Using the test transceiver, another network device with which the test transceiver is communicating can be monitored to identify its reaction to the introduced error. Since the introduced error from the test transceiver is known, controlled, specific and repeatable, the reaction to the introduced error by the network device can be easily determined and isolated.

In addition, another transceiver (a "corrective transceiver") in accordance with an implementation of the present invention can be configured to accommodate operating errors in other transceivers on the network. In one implementation, for example, a corrective transceiver can communicate out of band with another transceiver to identify a change in operating parameters of another transceiver, such as due to error or malfunction. The corrective transceiver can identify any new operating parameters in order to sync (and ultimately continue communications) with the errant transceiver, and further report the changes and/or new operating parameters to a listening portal.

In general, one will appreciate that virtually any function of a conventional transceiver can be varied in a test transceiver to introduce an error into a network, including any function disclosed in any multi-source agreement ("MSA"). For example, examples of MSAs that disclose various functions of transceivers that can be varied to create test transceivers include: (1) the "10 Gigabit Small Form Factor Pluggable Module," XFP MSA Rev.3.1, April 2003, (2) the "Gigabit Interface Converter" MSA Rev. 5.4, Aug. 16, 1999, (3) the "Diagnostic Monitoring Interface for Optical Xcvrs," SFF-8472, MSA Rev 9.3, Aug. 1, 2002, (4) the "Small Form Factor Transceiver Multisource Agreement," MSA Jul. 5, 2000, (5) the "Small Form Factor Transceiver Multisource Agreement," MSA Sep. 14, 2000, and (6) the "DWDM Pluggable Transceiver MSA," May 30, 2003.

The content of each of the above-mentioned MSAs is hereby incorporated by reference herein in their entirety. Other MSAs further disclose additional functions that may be varied in test transceivers according to the embodiments disclosed herein, and can be included for purposes of illustrating various embodiments of the test transceivers. The test transceivers may be varied in the form of changes to components, hardware, software, programming, mechanical variance or other changes to a conventional transceiver thereby resulting in a test transceiver that is configured to introduce an error into a network.

Examples of the functions of the test transceivers that may be used to introduce errors into a network include control functions, monitoring functions, transmit fault conditions, loss of signal fault conditions, optical signal functions, interoperability functions, mechanical function, electrical functions, data fields, and hardware of the test transceiver. Additional functions of the test transceivers that can be used to introduce errors include control of the test transceiver, identifier values, connector values, transceiver codes, encoding codes, checksum values, error/status bytes, a command structure, a module busy function, a transmitted data parameter, and generation of corrupt or false information.

Furthermore, a tester can modify in the test transceivers a function associated with an eye profile, an eye mask parameter, a threshold, a sensitivity, a parameter of a transmitted signal, a parameter of a received signal, an operating rate, a rise time, an output fall time, a bus frequency, a transmit disable function, a bandwidth function, and a transmit alarm function. For example, the tester can send a function control signal to the test transceiver via a contact or other interface to modify the function. Still further, a tester can modify a receive loss alarm function, a module sense function, a module enable function, a digital diagnostic function, an error in a command set, a temperature monitoring function, a temperature control function, a current monitoring function, and a current supply function. Yet still further, a tester can modify a power monitoring function, an alarm, a flag, warning, trip point, an attenuation, a power consumption, a function related to generation of electromagnetic energy, a function related to protection from electromagnetic energy, mechanical interoperability, or electrical interoperability.

Such test transceivers may allow anyone to test SERDES, HBAs, switches, or any network device (e.g., a transceiver) that has a required response to the data carried by the test transceivers, and any network device that uses a test transceiver for its response, to specific errors under perfect conditions other than that particular error introduced by the test transceiver. As such, these test transceivers allow a new point of network testing where a tester that is troubleshooting a network may simply introduce such transceiver(s) into the network, and monitor how other network devices react.

This can thus enable the tester to identify which network devices do not perform to their specifications. For example, a network device may be designed to react in a fail-safe manner (or simply fail) when an error (or level of error) is introduced into the network by another network device. Moreover, a network device may be designed to indicate that an error, or a particular error, was encountered when such error exists within the network. The network device may react to the error introduced by the test transceiver according to the network device's specification by providing information indicating that the error was encountered, and performing in a manner consistent with the network device's specification, or within a tolerance of a desired performance parameter. The network device may also react according to a specification or industry standard, or otherwise react as intended.

If the network device being monitored during introduction of a network error by a test transceiver does not react as intended, the network device can be identified. In addition, subsequent measures can be taken to insure that the network device, or similar network devices, react as intended in the future. For example, the particular network device that did not react as intended can be returned to a manufacturer of the particular network device for further analysis, or can be otherwise discarded.

Referring now to the figures, FIG. 1 illustrates a method for error testing a network. According to this embodiment, a network is error tested to see if a SERDES (or other network device) can handle an eye profile generated by a test transceiver in the manner that the specification of the SERDES specifies. Testing the SERDES, according to one embodiment of the invention, can include obtaining a set of specially programmed test transceivers that are programmed in steps with varying eye diameters (100). The method can also include connecting an output of the SERDES to a monitoring device (105).

The method further includes connecting a first of the series of transceivers having the best eye diameter that is least likely to cause failure is connected to the SERDES (100). The method further includes monitoring the SERDES to determine if the output of the SERDES is operating satisfactorily (115). If the output signal of the SERDES is satisfactory, the method includes replacing the transceiver with the next transceiver in the series of transceivers, where the next transceiver has a different eye diagram parameter (120). For example, the eye diagram parameter can be a narrower eye diagram, a different power level (amplitude), a different modulation (phase), a different rise time/fall time (polarization response as a function of frequency, and/or different pre-emphasis of the signal creating the eye diagram. Thus, while the eye diagram may appear the same on a scope, the eye diagram may have different eye diagram parameters. The method further includes again monitoring the SERDES to determine if the output of the SERDES is operating satisfactorily.

The tests are repeated by systematically introducing test transceivers into the network one at a time each subsequent transceiver producing an eye that is more likely to cause the SERDES to fail until the output of the SERDES is not operating satisfactory. If the SERDES does not operate satisfactorily an eye deviation that the SERDES cannot tolerate is known from the last test transceiver connected to the SERDES (125). Similarly, an approximate worst-case eye deviation that the SERDES can tolerate is known from the next-to-last test transceiver connected to the SERDES.

For example, where the test transceiver connected to the SERDES when the SERDES fails has been calibrated at the factory such that the exact parameters are known, the settings of the test transceiver and specific errors introduced thereby may be printed on a label, or on a certification, that is provided along with the test transceiver. Similarly, the settings of the next-to-last test transceiver and specific errors introduced thereby can be printed on the next-to-last test transceiver's label, or on a certification, provided with the next-to-last test transceiver. Thus, the eye deviation what the SERDES can (and cannot) handle will be known from the information provided with the test transceivers. Therefore, according to this example, the result received from the test transceiver in use when the SERDES failed can be compared to a specification of the SERDES to determine if the SERDES is reacting to the error (i.e., the eye profile of the test transceiver) as expected (i.e., according to a specification of the SERDES in this example).

A single test transceiver may also be used where the single test transceiver is reprogrammed to provide various levels of eye diameter and different eye diagram parameters. Thus, the method can include an act of reprogramming the test transceiver outside of the factory in place of the act replacing the test transceiver with a next transceiver (120). In this example, the test transceiver can be analyzed to determine the eye deviation and eye parameters the SERDES can handle.

Figure 2:
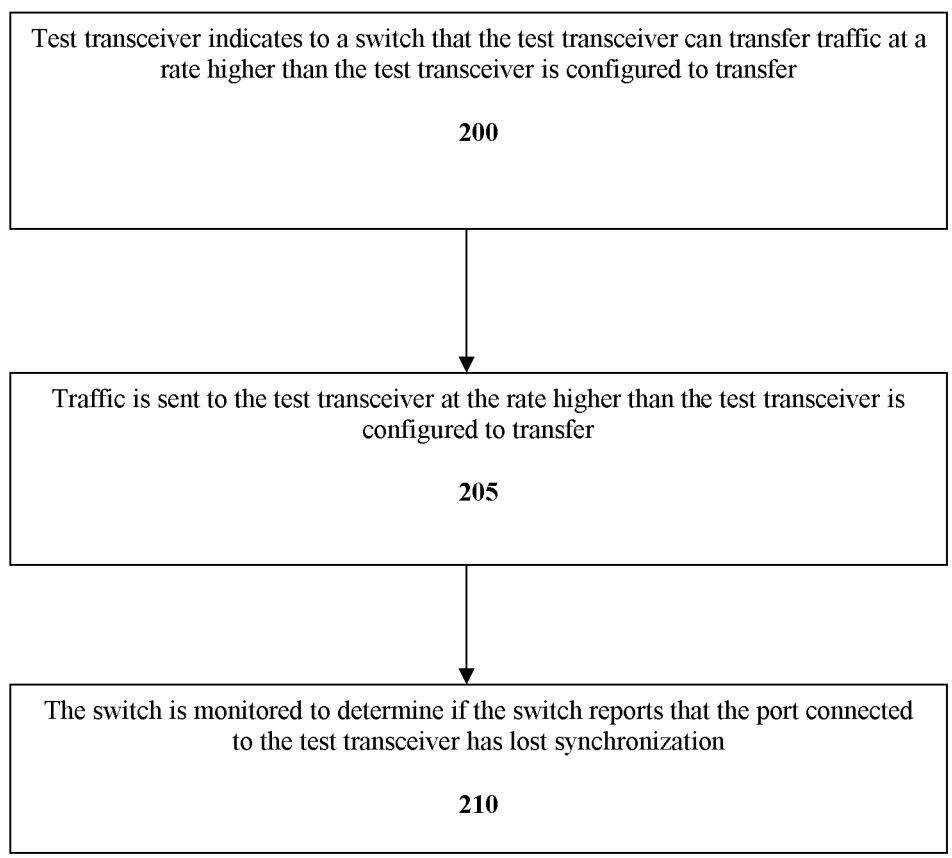
FIG. 2 illustrates a method for error testing of a switch (or other network device) to determine if an output of a port of the switch has synced up at a determined speed.

According to another example illustrated in FIG. 2, error testing of a switch (or other network device) may be conducted to determine if an output of a port of the switch has synced up at a determined speed. According to this example, a test transceiver sends information to the fabric layer switch introducing an error into a network. In this example, the information indicates to the switch that the test transceiver can handle a faster data rate than the test transceiver can actually handle (200). For example, a test transceiver that can only operate at one gigabits per second ("gbps") is inserted that reports that it can sync at one, two and four gbps with a switch that can handle four gbps traffic. The test transceiver plugs into the switch using its method of communication, (e.g., as defined in the type of transceiver's MSA) and is thus connected electrically with the data paths to its registers, and further obtains power from the switch. The test transceiver, when asked for the its digital diagnostics or its operational parameters informs the switch that the test transceiver can handle 1, 2, and 4 gbps. One test setup includes sending 4 gbps data to the port that the test transceiver is plugged into causing an auto speed sense switch to set the port to 4 gbps. The switch can also be manually set to put the port to 4 gbps. It can be verified that the switch obtained the identification information from the test transceiver that the test transceiver is configured to handle four gbps by verifying that the switch allows the port to be configured to 4 gbps.

In addition, traffic is sent to the test transceiver at the faster data rate reported by the test transceiver (205). For example, by sending traffic through the test transceiver either by mapping the test transceiver to a port with four gbps traffic or sending four gbps to the test transceiver. The switch is monitored to determine if the switch reports that the port connected to the test transceiver has lost synchronization (210). If the switch does not report that the port connected to the test transceiver has lost synchronization the switch may be considered to operate unsatisfactorily. If the switch does report that the port connected to the test transceiver has lost synchronization, the switch may be considered to operate satisfactorily.

In some embodiments, a second rate of traffic may be sent to the test transceiver either by mapping the test transceiver to a port associated with traffic at the second rate (e.g., a lower rate) of traffic. For example, the second rate of traffic may have a rate of 2 gbps, which is slower then the previously sent 4 gbps rate of traffic sent. The switch may again be monitored to determine if the switch reports that the port coupled to the test transceiver has lost synchronization. If the switch indicates that the port coupled to the test transceiver has lost synchronization the switch is operating according to its specification. If the switch does not report a loss of synchronization at the port coupled to the test transceiver the switch fails.

Figure 3:
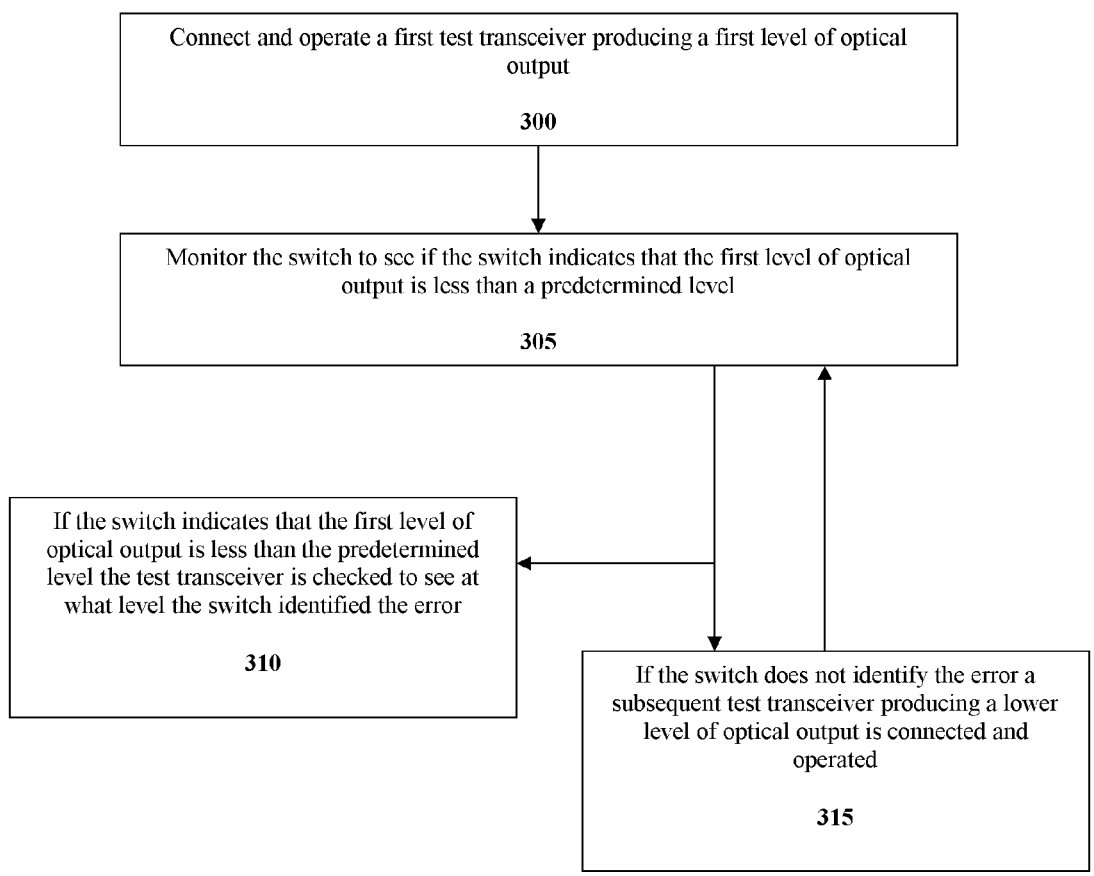
FIG. 3 illustrates a method for testing a series of test transceivers with varied levels of transmission output levels to verify that a switch is monitoring transceiver output level satisfactorily.

According to another example illustrated in FIG. 3, a series of test transceivers with varied levels of transmission output levels are used to verify that a switch is monitoring transceiver output level satisfactorily. For example, a first test transceiver having a first level of optical output is coupled to the switch (300). The switch is monitored to see if the switch sets an alarm indicating that the output is less than a predetermined level (305). If the switch indicates that the output level is less than a predetermined level, the test transceiver is checked to see at what output level (or drop in output level) the switch identified the error (310). If the transceiver has been calibrated at the factory, the exact parameters are known, for example, from a label or certification that comes with the test transceiver. Thus, the drop in output level that resulted in an error is known. On the other hand, if the switch does not indicate an error, the test transceiver is replaced with another test transceiver having a level of output that is lower than the level of output of the previous test transceiver (315).

The switch is again monitored to check if the switch indicates that the output is less than a predetermined level (305). If the switch returns an error, the test transceiver is checked to see at what output level the switch is identifying an error (310). If the switch does not return an error, the test transceiver is again replaced with a test transceiver having a level of output that is lower than the level of output of the previous test transceiver (315) and so forth until the switch indicates that the output is less than the predetermined level (310).

If a transceiver is used that produces a zero level of output (and the switch does not indicate an error), it is verified that the switch is not verifying an output level from the transceiver at all. If the switch does not identify an output level according to its specification, then the switch can be identified as not conforming to the switch's specification. The same set of tests can also be conducted using a single test transceiver that is reprogrammed to produce an output having various levels of power thereby introducing the various levels of error into the network. In each example disclosed herein where a series of transceivers are used, it should be appreciated that a single transceiver can be used and reprogrammed to introduce the series of errors in place of the series of transceivers.

A major difference between a series of transceivers and one programmable transceiver is that the series of transceivers can be calibrated at the factory and their exact parameters known. Due to the nature of the hardware, a programmable transceiver will typically be slightly different each time it is set to the same parameters. This means that the programmable transceiver may need to be measured when the failure occurs to get an exact point reference of the failure point. However, as technology improves this difference may not apply and the programmable test transceiver can be as consistent in reproducing the error as the calibrated set of transceivers.

Figure 4:
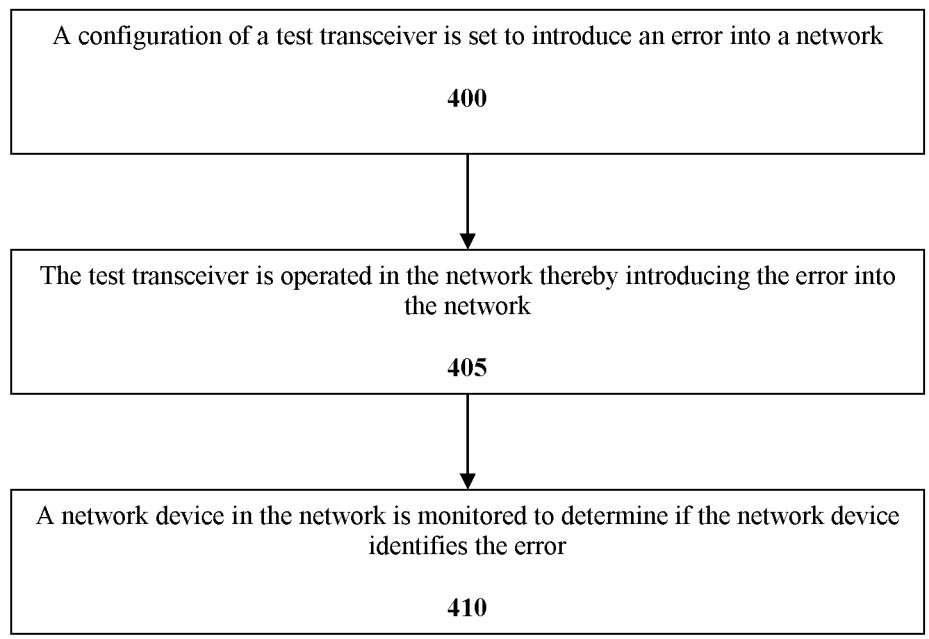
FIG. 4 illustrates a flowchart regarding what occurs inside an embodiment of a test transceiver in at least one implementation.

FIG. 4 illustrates a flow diagram showing what can occur inside an embodiment of a test transceiver. For example, a configuration inside the test transceiver is set so that the test transceiver is configured to introduce a predetermined error into a network (400). The configuration within the test transceiver can be changed by changing a configuration bit within the test transceiver from a 0 to a 1 or vice versa. A change in a configuration setting can also include changing a configuration register value within the test transceiver from a 'valid' value to a 'non-valid' value. These configuration registers or bits would either: (i) provide false data about the module, and/or, alternatively, (ii) the change in configuration setting can cause the module to function differently.

Examples of the former include identifying false information to a network device (such as a host coupled to the test transceiver). For example, the false information may indicate that the transceiver operates differently than it actual operates. Changing this configuration setting may not change the function of the test transceiver from when the test transceiver is manufactured, but rather, include a change in software or hardware. As such, additional tooling and/or manufacturing steps may not be required.

In any event, the test transceiver is then operated within the network so that an error is introduced into the network by the test transceiver (405). The test transceiver may be operated within the network by transferring data or information to another network device according to any of the functions discussed in the MSAs above, wherein the operation of the test transceiver introduces at least one error into the network. For example, the test transceiver can transmit a signal to a switch or an HBA type of network device. A network device operating in the network is monitored to determine if the network device identifies the error (410). If the network device performs as intended (e.g., identifying the error), the network device passes. If the network device does not perform as intended (e.g., not identifying the error), the network device fails.

Figure 5:
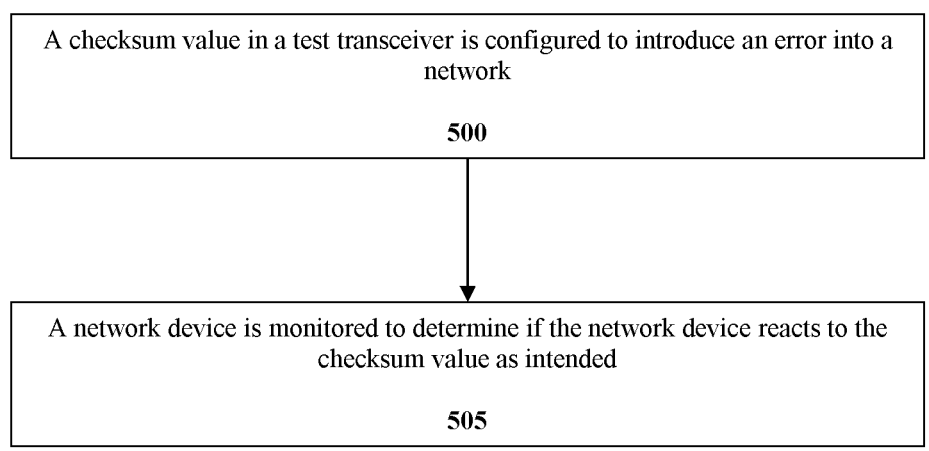
FIG. 5 illustrates a method for using a test transceiver to check if a network device is actually checking information sent to the network device by a transceiver.

FIG. 5 illustrates yet another example in which a test transceiver can be used to check if a network device is actually checking information sent to the network device by a transceiver. For example, a checksum value stored within a test transceiver can be changed, thereby configuring the test transceiver to introduce an error into a network (500). The altered checksum may be specified in an MSA (such as those incorporated herein, as well as others) and indicates that some data has changed. This checksum does not change the operation of the test transceiver in this embodiment; however, a network device (such as a host device coupled to the test transceiver) can read the altered checksum.

The network device communicating with the transceiver is monitored to determine if the network device reacts as intended (e.g., according to a specification or industry requirement) (505). If the network device does not operate as intended, the network device may be further analyzed (or returned to the manufacturer of the network device) to determine why the network device did not operate as expected. For example, where the checksum value has been changed an HBA should report that the checksum value of the test transceiver is bad.

Figure 6:
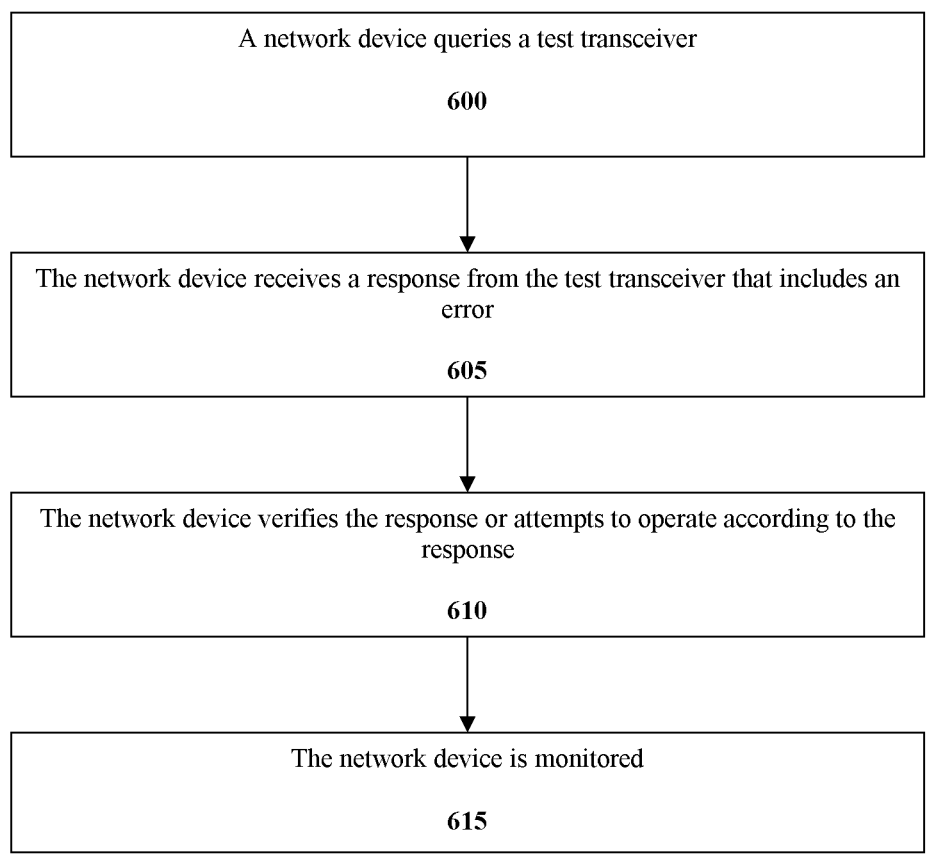
FIG. 6 illustrates another method for introducing an error into a network.

FIG. 6 illustrates a method for introducing an error into a network. For example, a network device queries a test transceiver (600). The test transceiver is introduced into a network that includes the network device (such as a host coupled to the test transceiver). The network device receives a response from a test transceiver that includes an error, such as data falsely identifying the test transceiver (605). The network device then verifies the data (if the network device is capable) or the network device attempts to operate using that data provided by the test transceiver (610). In addition, the network device is monitored (615). If the network device reacts (e.g., operates or identifies the error) as expected, then the network device passes the requirements of the network device's specification. If the network device reacts (e.g., operates or fails to identify the error) different than expected, then the network device fails the requirements of the network devices specification.

According to another example, a test transceiver is configured not to communicate to the host via a serial interface. According to another example, a laser of a test transceiver is configured not to operate. According to another example, laser operating conditions are configured to have poor mask, margin, jitter, extinction ratio, average power, and/or receive amplitude that introduce an error into a network. In each of these examples, an error is introduced into a network by operating the test transceiver within the network and monitoring at least one network device within the network.

Figure 7:
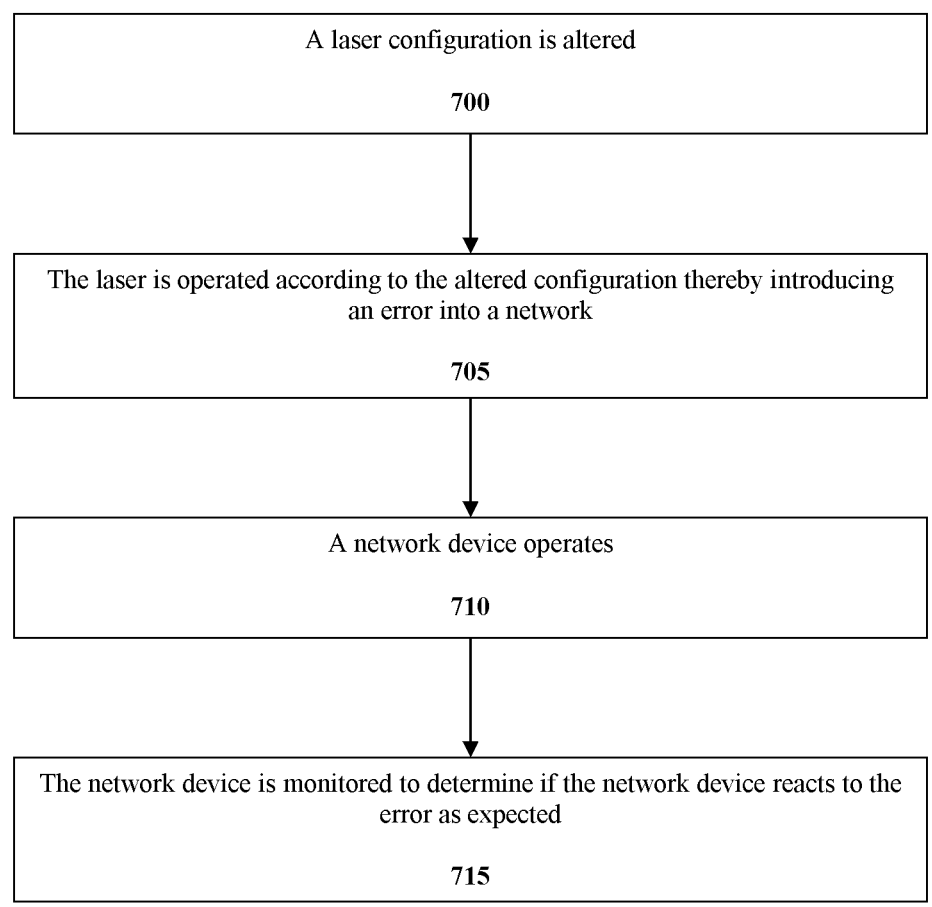
FIG. 7 illustrates a method for introducing one or more errors into a network to error test network devices within the network.

FIG. 7 illustrates another method for introducing one or more errors into a network to error test network devices within the network. For example, step 700 shows that, within a test transceiver, firmware indicates to the microcontroller to alter one or more laser operation configurations. A microcontroller causes the laser to be operated in a faulty or marginal manner, thereby introducing an error into a network (705). A network device then attempts to operate under the error introduced by the test transceiver (710) (e.g., a marginal or faulty condition of the test transceiver). The network device is monitored (715). If the network device reacts (e.g., operates as expected in accordance with a specification or industry parameter), then the network device is considered to be in accordance with its specification. If the network device does not react as expected, then the network device is considered not to be in accordance with its specification.

Changes in a test transceiver can be changes in a conventional transceiver. For example, the changes can be entirely new and different firmware (or microcode) designed to operate in a specific way. These changes can be configured so that the conventional transceiver introduces a predetermined error into a network, and thereby operates according to any of the embodiments disclosed herein. In particular, any standardized operating parameter of a conventional transceiver can be altered to create a test transceiver that is subsequently used to introduce errors into a network to test devices of the network.

Figure 8:
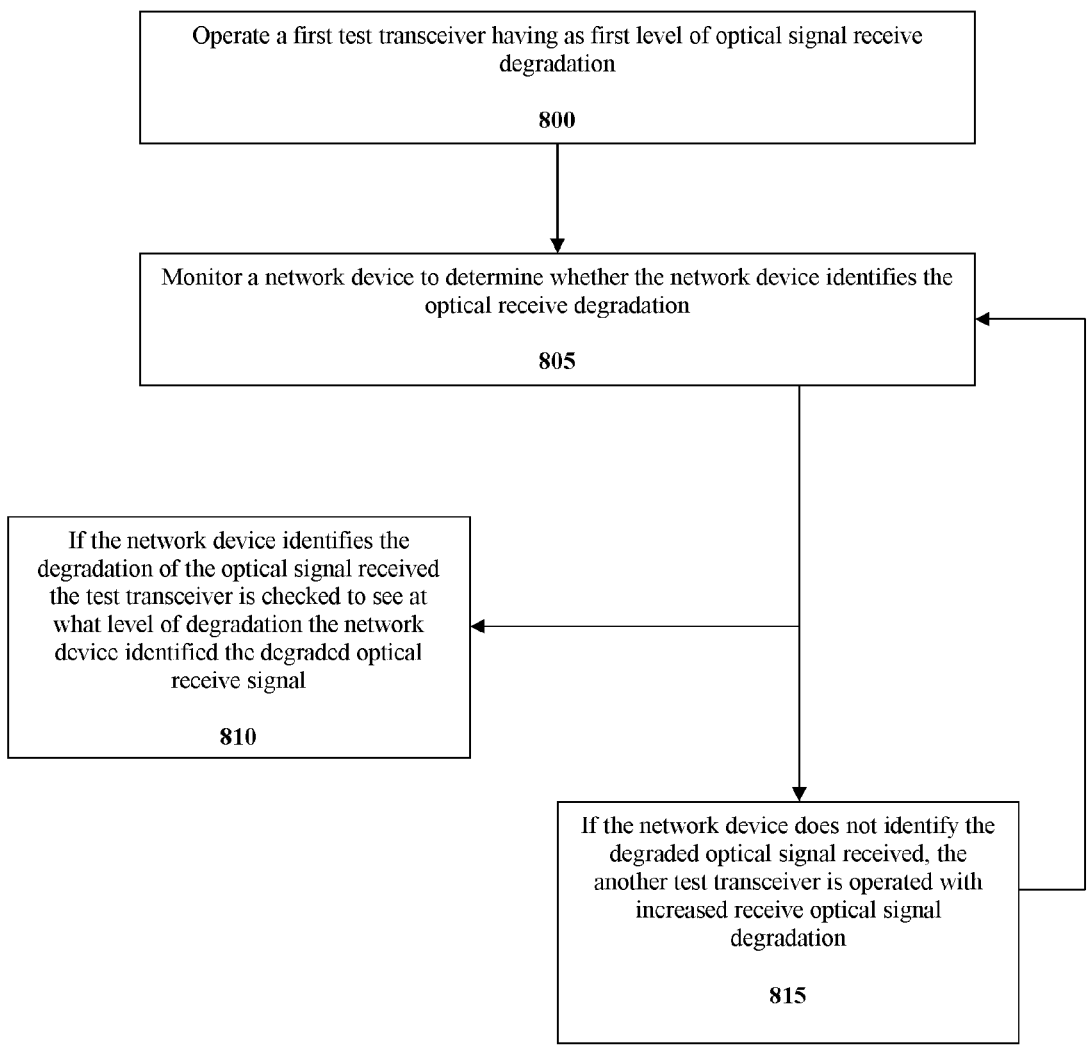
FIG. 8 illustrates a method for using a calibrated set of test transceivers that degrade a received signal a specified amount to verify that a network device notes such degradation type of error.

FIG. 8 illustrates a method for using a calibrated set of test transceivers configured to degrade a received signal a specified amount in order to verify that a network device notes such degradation type of error. For example, a first test transceiver is coupled to the network device having a first minimal level of receive degradation (800). The network device is monitored to determine whether the network device identifies the receive degradation (805). If the network device identifies the receive degradation according to its specification the network device passes the test (810).

If the network device does not identify the received degraded receive signal, a second test transceiver is inserted that increases the level of signal receive degradation type of error (815). The network device is again monitored to see if the network device identifies the degraded receive signal (805), and so on. Once the network device identifies the degraded receive signal (810), the test transceiver is checked to determine at what level the network device reported the error. It should be noted that a single test transceiver can be used and reprogrammed to introduce the different levels of signal degradation.

According to any of the tests disclosed herein, the level of error introduced into the network can be gradually increased (and/or gradually decreased) in order to determine a point at which the error is discovered by the network device, or to discover a point at which the network device no longer performs according to the network device's specification.

Figure 9:
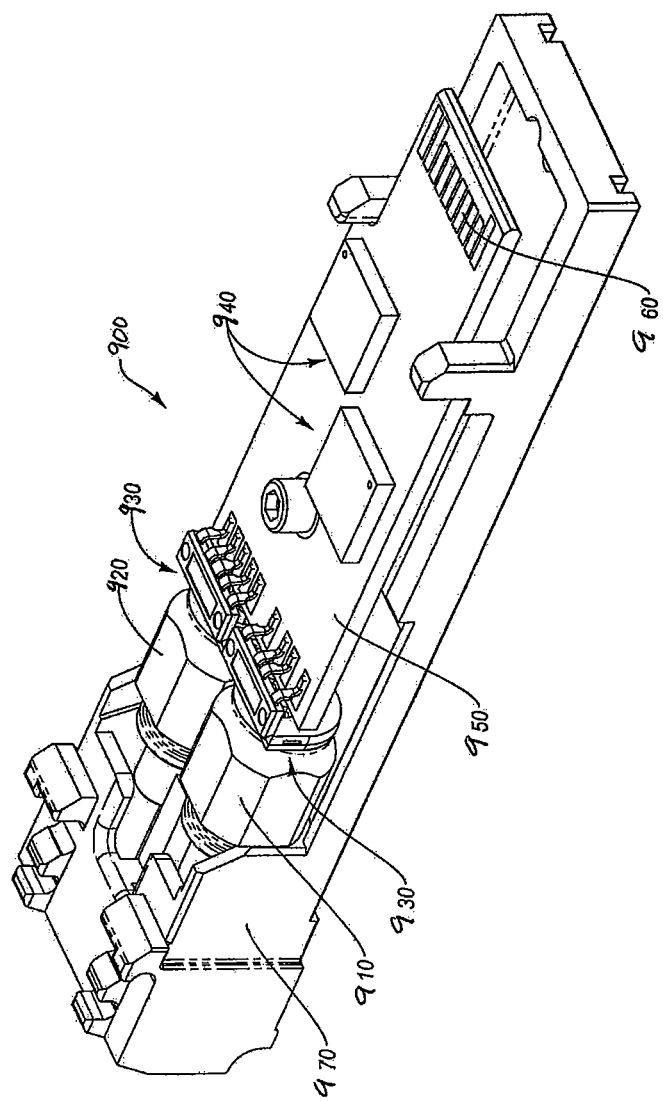
FIG. 9 illustrates a perspective view of a test transceiver for use in error testing a network.

FIG. 9 depicts a perspective view of a test transceiver, generally designated at 900, for use in error testing a network. As depicted, the test transceiver 900 includes various components, including an optical receiver implemented as a receiver optical subassembly ("ROSA") 910, an optical transmitter implemented as a transmitter optical subassembly ("TOSA") 920, electrical interfaces 930, various electronic components 940, and a printed circuit board 950.

In detail, two electrical interfaces 930 are included in the test transceiver 900, one each used to electrically connect the ROSA 910 and the TOSA 920 to a plurality of conductive pads located on the PCB 950. The electronic components 940 are also operably attached to the PCB 950. An edge connector 960 is located on an end of the PCB 950 to enable the test transceiver 900 to electrically interface with a host (not shown here). As such, the PCB 950 facilitates electrical communication between the ROSA 910/TOSA 920, and the host. In addition, the above-mentioned components of the test transceiver 900 are partially housed within a housing portion 970. Though not shown, a shell can cooperate with the housing portion 970 to define a covering for the components of the test transceiver 900.

The test transceiver 900 is configured to introduce an error into a network. The test transceiver can include a component (or lack of component), firmware, software or other executable means for introducing an error in to a network in which the test transceiver operates. Any other network device in the network in which the test transceiver 900 operates can be monitored in order to determine how the network device reacts when the network device encounters the error introduced by the test transceiver 900.

Examples of the functions of the test transceiver 900 that may be used to introduce errors into a network include, as previously described, control functions, monitoring functions, transmit fault conditions, loss of signal fault conditions, optical functions, interoperability functions, mechanical function, electrical function, or a data field. In addition, components that can be modified to introduce an error also include hardware of the test transceiver, control of the test transceiver, an identifier value, a connector value, a transceiver code, and encoding code, an optional value, a date code, a data field, a checksum value, an error/status byte, a command structure, a module busy function, or an a transmitted data parameter.

Furthermore, a tester can (in the test transceiver) corrupt information, modify a function associated with an eye profile, an eye mask parameter, a threshold, a sensitivity, a parameter of a transmitted signal, a parameter of a received signal, an operating rate, a rise time, an output fall time, or a bus frequency. Still further, the tester can modify (in the test transceiver) a transmit disable function, a bandwidth function, a transmit alarm function, a receive loss alarm function, a module sense function, a module enable function, a digital diagnostic function, an error in a command set, a temperature monitoring or supply function, or a current monitoring or supply function. Yet still further, the tester can modify a power monitoring function, an alarm, a flag, a warning, a trip point, an attenuation, a power consumption, an function related to generation of electromagnetic energy or protection from electromagnetic energy, and mechanical or electrical interoperability.

While FIG. 9 illustrates a particular type and form factor of transceiver it is appreciated that the teachings herein are applicable to any network device. For example, any network device may be configured to introduce an error into a network to error test other network devices within the network, including, for example transceivers in the form of SFP, SFX, GBIC, XFP, XAUI, SFF, 1x9 Transceivers, 300pin Transponders, XFP Transceivers, and SFP+Transceivers, or the like. Such transceivers as those listed can be particularly advantageous for error testing networks, at least for the reason that they may include controllers, active devices, and various functions that have a wide range of ability to introduce errors into a network.

In addition to the foregoing, implementations of the present invention can also include one or more transceivers configured to accommodate (or adjust to) known errors on the network due to another transceiver that is functioning in an unexpected or errant manner. In particular, implementations of the present invention can include a "corrective transceiver," which is in communication with one or more other transceivers in a network using both in-band and out-of-band communications. Specifically, the corrective transceiver can be configured at least in part to communicate out-of-band with one or more other transceivers on a communication network (e.g., fiber optic network, or the like) to identify, for example, the operating metrics of other network devices (over the network connection between them), such as due to error, malfunction, or simply a loss in transmission power due to aging. Identifying such information can allow the corrective transceiver to adjust its own operating parameters (much like a test transceiver) pursuant to re-syncing, and also to push various reporting information to a listening portal.

Figure 10:
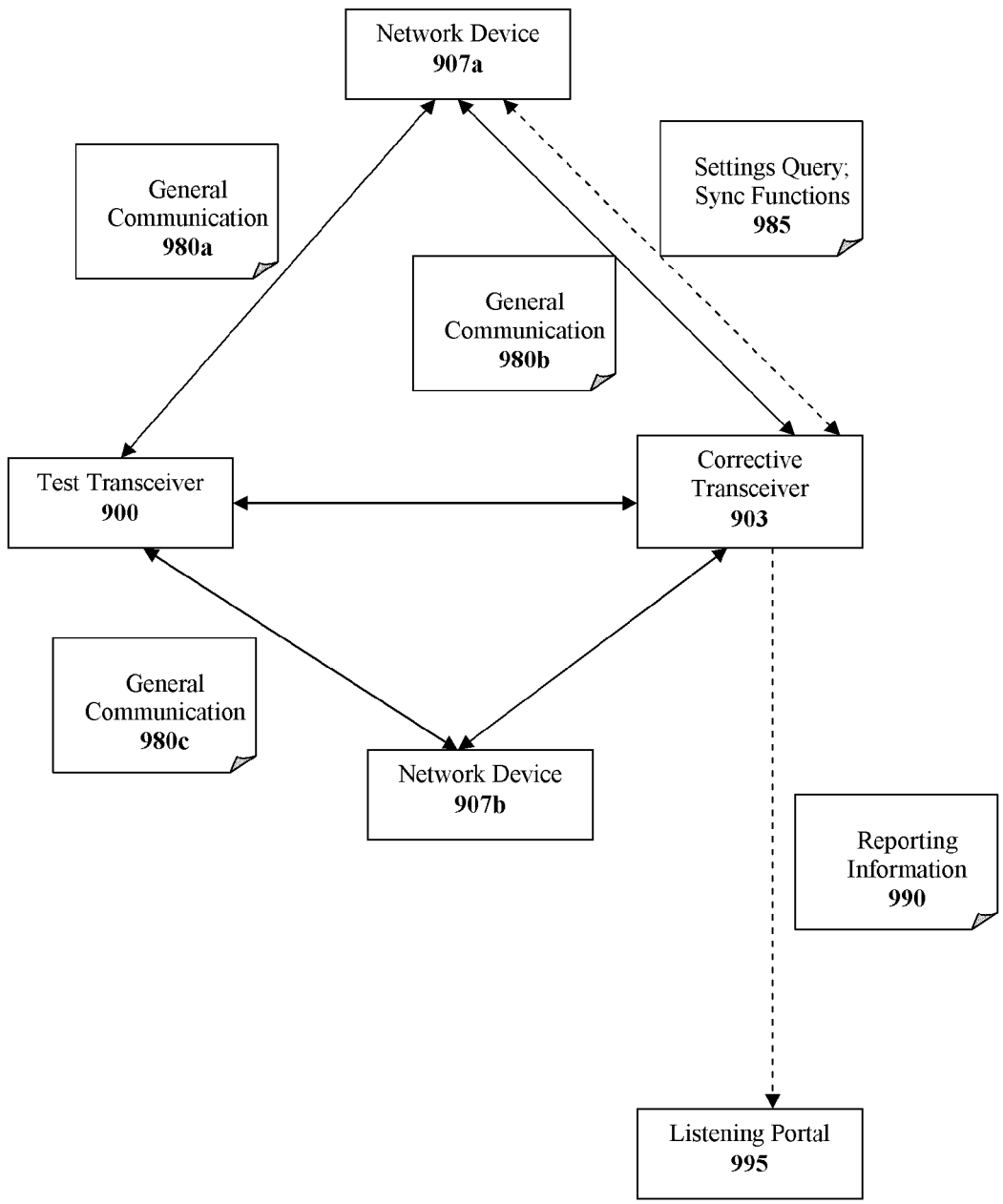
FIG. 10 illustrates a schematic diagram in which a test transceiver and a corrective transceiver are used in a network setting with a plurality of other network devices.

For example, FIG. 10 illustrates a schematic diagram in which a test transceiver and a corrective transceiver are used in a network setting with a plurality of other network devices. As shown, one implementation of a network can include a plurality of different network devices, such as test transceiver 900, corrective transceiver 903, and network devices 907*a* and 907*b*. Each of these devices can be communicating with each other in one form or another, such as shown with "general communication" 980*a*, 980*b*, and 980*c* (e.g., general send/receive messages). In general, the general communication messages comprise communication that occurs between devices that are appropriately synchronized with respect to power and speed settings.

In addition to the foregoing, however, FIG. 10 shows that corrective transceiver 903 initiates one or more out-of-band communications, such as shown in the dotted lines with communication 985. Corrective transceiver 903 can establish this communication 985 without necessarily requiring stringent power and speed settings, which are typically required with conventional communication between two different network devices. This out-of-band communication allows corrective transceiver 903 to periodically ascertain any changes in the communication patterns of a given network device. For example, corrective transceiver 903 can use the out-of-band communication channel to identify that network device 907a is operating at reduced power or speed/throughput settings (e.g., due to some device malfunction, failure, or simply due to aging), or that network device 907a has paused momentarily during communication.

Upon detecting any change to network device 907a, corrective transceiver 903 can perform one or more settings queries via communication 985 with network device 907a. In one implementation, communication 985 allows corrective transceiver 903 to determine with precision, for example, such critical information as the network device's transmission power and speed/throughput settings (or other relevant operational metrics) in network device 907a. In response, corrective transceiver 903, can adjust its own settings in order to sync with network device 907a under the new settings for the network device. Furthermore, corrective transceiver 903 can instruct other network devices that might be communicating with a changed (or modified, errant, or malfunctioning) network device 907a to meet the newer, detected settings. For example, corrective transceiver 903 can also send instructions to one or more other network devices (e.g., 900, 907b) to adjust their respective operating parameters pursuant to syncing with network device 907a.

Upon detecting a drop in receive power, the corrective transceiver can query the transceiver that is upstream from it (sending to it) to see if this transceiver is sending at reduced power, or if the cabling between them has developed a problem. The problem could be, for example, that someone stepped on the cable and shattered the glass therein, or that someone plugged and unplugged a cable without cleaning it (where dirt caused a power drop). Alternatively, the problem could be a bend in the cable that was tightened, and the angle of the bend is now causing a power loss. The two transceivers can thus coordinate how much the upstream transceiver can update its parameters (e.g., increase its power) as a temporary solution until the problem can be fixed. Then the downstream transceiver (e.g., corrective transceiver) can push the error to the listening portal (e.g., 995) for analysis. In at least one implementation, all corrective transceivers can pass or push a message (e.g., 990) along the optical fiber to ensure that the message eventually arrives at an appropriate listening portal (e.g., 995).

In particular, and in addition to adjusting its own parameters or the parameters of other network devices, corrective transceiver 903 can continually pass this various operational information (e.g., 990), or other general information it detects about network devices, to a listening portal 995. For example, corrective transceiver 903 can send (generally via push mechanisms) one or more reports to listening portal 995 that network device 907a paused in operation, or that network device 907a or test transceiver 900 are operating at less (or greater) than expected operating parameters.

In at least one implementation, corrective transceiver 903 pushes this reporting information 990 to listening portal 995 over one or more wireless communication links. Similarly, any corrective transceiver 903 can also communicate out-of-band communication with any other network device (e.g., 907a-b), and can further communicate over wireless communication links. For example, corrective transceiver 903 can include (or be included with) one or more wireless transceiver modules. In one implementation, the corrective transceiver 903 can communicate in-band or out-of-band with any other network device (e.g., transceiver) through optical communication, and can further communicate wirelessly with one or more other network devices, including the listening portal 995.

In any event, a tester (e.g., user/operator, or monitoring system) that is monitoring the listening portal 995, in turn, can take a number of actions upon receiving reporting information 990. For example, the tester might tell corrective transceiver 903 to ignore unexpected results found in test transceiver 900, since test transceiver 900 may be purposefully manipulating its communications as described herein for testing purposes. Alternatively, the tester might be able to quickly identify from the report 990 that network device 907a may be malfunctioning, but that network communication is continuing due to the accommodations or corrective changes implemented by corrective transceiver 903.

Thus, the tester may recognize from information 990 that the network device 907a may need to be replaced soon, and that network traffic will be operating at a sub-optimum level in the meantime due to the errant or sub-optimum network device. Similarly, the tester may be able to notice from reporting information 990 that there has been an intrusion in the network. For example, the tester may deduce from a reported pause in communications with network device 907a that the pause may be the result of a malicious party installing a "listener" or some other form of patch on network device 907a. Alternatively, the tester might identify that the change in operational parameters or perceived errors are due entirely to actions by test transceiver 900, and thus can instruct corrective transceiver 903 to ignore settings from test transceiver 900.

Accordingly, a tester may desire to employ a number of different corrective transceivers 903 in addition to any number of different test transceivers 900 for a variety of ends. For example, a tester could employ any number of different test transceivers 900 configured to push out information that the test transceiver finds out about other network devices. In one implementation, the test transceiver can use discovered information to request that the other network devices tweak their transmit power, so the test transceiver 900 can set up a fail point to be another (corrective or test) transceiver on the network.

Along these lines, the test transceiver 900 can be configured to turn a corrective transceiver 903 into another form of test transceiver that is operating at sub-optimal levels, and still pushing data to listening portal 995. In addition, test transceiver 900 can be configured to ignore settings queries from corrective transceiver, or to ignore synchronization requests from corrective transceiver 903, such as by sending one or more cease and desist signals to corrective transceiver 903. In many cases, therefore, what constitutes a test transceiver 900 or a corrective transceiver 903 may be blurred in some cases where both may be adjusting their operating parameters, albeit primarily for different purposes. In any event, since at least corrective transceiver 903 is continually pushing reporting data 990 to a listening portal 995 regarding its out-of-band network communications, a tester can always determine if the reported actions and messages should raise any concern.

As such, one will appreciate that corrective transceiver 903 and test transceiver 900 can be used to provide a variety of metrics about physical layer communications, which were either impractical or impossible to deduce using prior art mechanisms and components without undue costs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A test transceiver comprising:
    at least one of a receive optical subassembly ("ROSA") or a transmit optical subassembly ("TOSA"); and
    a controller, wherein the test transceiver is configured to:
        introduce a predetermined transceiver performance error into an optical network;
        control operation of the ROSA;
        control operation of the TOSA; and
        control out of band signaling with other network devices to allow the test transceiver to correct problems that the test transceiver detects on the optical network.

2. A test transceiver according to claim 1, wherein the controller is further configured to provide erroneous information describing the test transceiver to a network device of the optical network.

3. A test transceiver according to claim 1, wherein the transceiver performance error includes a data transmission rate error.

4. A test transceiver according to claim 1, wherein the transceiver performance error includes optical signal rise time error, an optical signal fall time error, a bus frequency error, a transmit disable error, a bandwidth error, and/or a digital diagnostic error.

5. A plurality of test transceivers according to claim 1, each of the plurality of test transceiver being configured to introduce a different error into the network.

6. A plurality of test transceivers according to claim 5, wherein each of the plurality of test transceivers is configured to introduce a progressively higher level of error into the network.

7. A test transceiver according to claim 1, wherein the transceiver performance error includes:
    an error associated with an optical signal eye profile;
    a data transmission rate error; and
    at least one of: an optical signal rise time error, an optical signal fall time error, a bus frequency error, a transmit disable error, a bandwidth error, and/or a digital diagnostic error.

8. A test transceiver comprising:
    at least one of a receive optical subassembly ("ROSA") or a transmit optical subassembly ("TOSA"); and
    a controller, wherein the test transceiver is configured to introduce a predetermined transceiver performance error into an optical network;
    wherein the transceiver performance error includes an error associated with an optical signal eye profile.

9. A test transceiver comprising:
    at least one of a receive optical subassembly ("ROSA") or a transmit optical subassembly ("TOSA"); and
    a controller, wherein the test transceiver is configured to introduce a predetermined error into an optical network, wherein the controller is configured to provide erroneous information to a network device of the optical network, wherein the erroneous information includes an erroneous identification of the test transceiver or an erroneous identification of an operating parameter of the test transceiver.

10. A test transceiver according to claim 9, wherein the erroneous information includes an erroneous identifier value, an erroneous connector value, an erroneous transceiver code, an erroneous encoding code, an erroneous checksum value, erroneous status information, and/or information erroneously identifying a performance setting of the test transceiver.

11. A test transceiver comprising:
    at least one of a receive optical subassembly ("ROSA") or a transmit optical subassembly ("TOSA"); and
    a controller, wherein the test transceiver is configured to introduce a predetermined error into an optical network; and
    an interface configured to receive a function control signal from a tester, wherein in response to the function control signal the predetermined error introduced into the network is modified.

12. A test transceiver according to claim 11, wherein in response to the function control signal, the level of error introduced into the network is increased or decreased.

13. A test transceiver according to claim 11, wherein in response to the function control signal, the type of error introduced into the network is modified.

14. A system including a test transceiver according to claim 11 and a tester, the tester being interfaced with the test transceiver and the tester being configured to transmit the function control signal to the transceiver to modify the error introduced into the network by the test transceiver, wherein the tester is further configured to monitor a network device to determine how the network device reacts to the introduced error.

15. A method for verifying that a network device of a network is performing according to the network device's specification, comprising:
    coupling each of a set of test transceivers to the network, wherein each of the set of test transceivers is configured to introduce a different predetermined error into the network;
    operating each of the set of test transceivers to introduce the respective predetermined errors into the network; and
    monitoring the network device to determine how the network device performs when the respective predetermined errors are introduced into the network.

16. A method according to claim 15, wherein at least one of the respective predetermined errors comprises a transceiver performance error.

17. A method according to claim 16, wherein the transceiver performance error includes an error associated with an optical signal eye profile, a data transmission rate error, an optical signal rise time error, an optical signal fall time error, a bus frequency error, a transmit disable error, a bandwidth error, and/or a digital diagnostic error.

* * * * *